United States Patent
Wakabayashi et al.

(10) Patent No.: US 6,409,285 B1
(45) Date of Patent: Jun. 25, 2002

(54) FRONT WHEEL AND REAR WHEEL INTERLOCKING BRAKE SYSTEM FOR MOTORCYCLE

(75) Inventors: Takeshi Wakabayashi; Kazuhiko Tani, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/527,673

(22) Filed: Mar. 17, 2000

(30) Foreign Application Priority Data

Mar. 17, 1999 (JP) .......................... 11-072268

(51) Int. Cl.[7] .............................. B60T 13/00
(52) U.S. Cl. ..................... 303/9.64; 303/137
(58) Field of Search .................. 303/3, 9.61, 9.64, 303/15, 137; 188/72.5

(56) References Cited

U.S. PATENT DOCUMENTS

| | | | |
|---|---|---|---|
| 3,839,868 A | * 10/1974 | Watanabe | 60/581 |
| 4,953,917 A | * 9/1990 | Wittich | 303/961 |
| 5,150,298 A | * 9/1992 | Fujioka et al. | 364/426.02 |
| 5,172,960 A | * 12/1992 | Chareire | 303/100 |
| 5,219,211 A | * 6/1993 | Tsuchida et al. | 303/9.64 |
| 5,257,856 A | * 11/1993 | Ota et al. | 303/100 |
| 5,273,346 A | * 12/1993 | Tsuchida et al. | 303/2 |
| 5,372,408 A | * 12/1994 | Tsuchida et al. | 303/9.64 |
| 5,618,088 A | * 4/1997 | Roll et al. | 303/158 |
| 5,620,237 A | * 4/1997 | Iwashita et al. | 303/9.64 |
| 6,062,660 A | * 5/2000 | Matsuno et al. | 303/173 |
| 6,089,682 A | * 7/2000 | Ishikawa et al. | 303/163 |

FOREIGN PATENT DOCUMENTS

JP 7-196068 A 8/1995

* cited by examiner

*Primary Examiner*—Paul N. Dickson
*Assistant Examiner*—Xuan Lan Nguyen
(74) *Attorney, Agent, or Firm*—Birch, Stewart, Kolasch & Birch, LLP

(57) ABSTRACT

To provide a front wheel and rear wheel interlocking brake system having a simple structure, which is capable of automatically performing brake control of the front and rear wheels on the basis of the running state of the motorcycle. A front wheel and rear wheel interlocking brake system is provided for a motorcycle in which a front wheel brake and a rear wheel brake, each being hydraulically operated, are provided on a front wheel and a rear wheel, respectively. The brake system includes a front wheel side actuator for applying a hydraulic pressure to the front wheel brake. A rear wheel side actuator is provided for applying a hydraulic pressure to the rear wheel brake. At least one operating member is operated by a driver. An operated amount detecting member is provided for detecting the operated amounts of each brake operating member. A control member is provided for receiving and calculating each of operated amounts detected by each operated amount detecting member. An outputting drive control signals to the front wheel side actuator and the rear wheel side actuator on the basis of the calculated result. In this brake system, the control member performs brake control for single brake control for singly driving either the front wheel brake or the rear wheel brake and interlocking brake control for driving the front and rear wheel brakes in accordance with a specific braking force distribution characteristic, and causes control to switch between single brake control and interlocking brake control on the basis of the operated amounts detected by the first and second pressure sensors.

8 Claims, 7 Drawing Sheets

FRONT WHEEL AND REAR WHEEL INTERLOCKING BRAKE SYSTEM FOR MOTORCYCLE

BACKGROUND OF THE INVENTION

1. Field of the Invention

The present invention relates to a front wheel and rear wheel interlocking brake system for a motorcycle, which allows interlocking brake operation between front and rear wheel brakes.

2. Description of Background Art

The brake operation of a motorcycle is performed by a brake lever provided on a handle grip and a brake pedal provided on a step, and a front wheel brake and a rear wheel brake are operated independently or simultaneously as needed by operation of the brake lever and the brake pedal as the brake operating means.

For example, Japanese Patent Laid-open No. Hei 7-196068 discloses an example in which electronic control is partially utilized for brake operation. A braking line of this example is shown in FIG. 10.

A front wheel brake 02 and a rear wheel brake 05 are each configured as a hydraulic brake, and a lever master cylinder 07 is provided on a brake lever 06 as an operating means and a pedal master cylinder 012 is provided on a brake pedal 011 as an operating means.

A lever hydraulic pressure line 08 extending from the lever master cylinder 07 is connected to the front wheel brake 02, and a pedal hydraulic pressure line 013 extending from the pedal master cylinder 012 is connected to one port of the threeport type rear wheel brake 05. A hydraulic pressure circuit 014 branched from the pedal hydraulic pressure line 013 is connected to a secondary master cylinder 010, and the output side of the secondary master cylinder 010 is connected to the other twoports of the rear wheel brake 05 via a control valve 016.

On the other hand, the braking line includes an electronic control braking line in which a brake switch 040 opened and closed on the basis of the presence and absence of the turning motion of the brake lever 06 is provided on the brake lever 06 and a pressure sensor 041 for detecting a hydraulic pressure is provided on the lever hydraulic pressure line 08, wherein the control unit 031 determines a hydraulic pressure to be generated in the secondary master cylinder 010 on the basis of detection signals from the brake switch 040 and the pressure sensor 041, and operates an actuator 033 via a relay 032 to generate a hydraulic pressure in the secondary master cylinder 010.

In the case of single operation of the brake pedal 011, only the rear wheel 05 side is operated irrespective of the front wheel side.

In the case of single operation of the brake lever 06 or simultaneous operation of the brake lever 06 and the brake pedal 011, a hydraulic pressure of the lever master cylinder 07 operates the front wheel brake 02 and, simultaneously, the actuator 033 is operated on the basis of the hydraulic pressure of the lever hydraulic pressure line 08 to generate a specific hydraulic pressure in the secondary master cylinder 010, thereby interlocking the rear wheel brake 05 by the control valve 016.

Since the secondary master cylinder 010 receives the hydraulic pressure of the electronic control brake system caused by operation of the brake lever 06 and the hydraulic pressure of the pedal hydraulic pressure line 013 caused by operation of the brake pedal 011, the output from the secondary master cylinder 010 becomes higher. Accordingly, during a period in which one of the above-described two kinds of hydraulic pressures are inputted in the secondary master cylinder 010, the other one cannot be additionally inputted in the secondary master cylinder 010.

When the brake pedal 011 is singly operated, only the rear wheel brake 05 is operated, that is, the front wheel brake 02 cannot be operated to interlock with the rear wheel brake 05 irrespective of the running state of the motorcycle, with a result that it is impossible to perform brake control based on an ideal braking force distribution characteristic.

To be more specific, when the brake pedal 011 is singly operated, it is impossible to suitably switch the brake control between single brake control and interlocking brake control on the basis of the hydraulic pressure of the hydraulic pressure line or information on running state of the motorcycle, and also it is impossible to change the distribution characteristic of braking forces of the front and rear wheels on the basis of the running state.

The above-described prior art brake system has another problem. Since the pedal hydraulic pressure line 013 is branched on the way into the lines connected to the rear wheel brake 05 and the secondary master cylinder 010 and also the control valve 016 is disposed between the secondary master cylinder 010 and the rear wheel brake 05, the number of parts is larger and the structure is complicated, and further the piping work and maintenance work become cumbersome.

A further problem of the prior art brake system is that the piping layout is limited by the above complicated structure, to reduce the degree of freedom in the piping layout.

SUMMARY AND OBJECTS OF THE INVENTION

In view of the foregoing, the present invention has been made, and an object of the present invention is to provide a front wheel and rear wheel interlocking brake system having a simple structure, which is capable of automatically performing brake control of the front and rear wheels on the basis of the running state of the motorcycle.

To achieve the above object, there is provided a front wheel and rear wheel interlocking brake system for a motorcycle in which a front wheel brake and a rear wheel brake, each being hydraulically operated, are provided on a front wheel and a rear wheel, respectively. The brake system includes a front wheel side actuator for applying a hydraulic pressure to the front wheel brake. A rear wheel side actuator is provided for applying a hydraulic pressure to the rear wheel brake. First and second brake operating means are operated by a driver. First and second operated amount detecting means are provided for detecting operated amounts of the first and second brake operating means, respectively. A control means is provided for receiving and calculating each of operated amounts detected by the first and second operated amount detecting means, and outputting drive control signals to the front wheel side actuator and the rear wheel side actuator on the basis of the calculated result. The control means performs brake control in such a manner that single brake control for singly driving either the front wheel brake or the rear wheel brake and interlocking brake control for driving the front and rear wheel brakes in accordance with a specific braking force distribution characteristic are switched from each other on the basis of the operated amounts detected by the first and second operated amount detecting means.

Since the brake control is performed in such a manner that single brake control and interlocking brake control in accordance with a specific braking force distribution characteristic are switched from each other on the basis of the detected operated amounts, it is possible to automatically perform brake control of the front wheel and rear wheel on the basis of the running state of the motorcycle due to the brake operation.

Since the brake system has a simple structure in which the front wheel side actuator for operating the front wheel brake and the rear wheel side actuator for operating the rear wheel brake are driven by the control means, it is possible to easily perform the piping work and maintenance work and to increase the degree of freedom in piping layout.

According to the present invention, the control means performs brake control in such a manner that when either of the first and second brake operating means is operated, the single brake control is performed until the detected operated amount reaches a specific value, and if the detected operated amount exceeds the specific value, the single brake control is switched into the interlocking brake control.

Even when either of the first and second brake operating means is operated, if the detected operated amount exceeds a specific value, single brake control is switched into interlocking brake control in which both the front and rear brakes are operated to interlock with each other, it is possible to realize a smooth and effective brake control on the basis of the running state of the motorcycle due to the brake operation.

According to the present invention, the control means performs brake control in such a manner that the interlocking brake control is performed until the detected operated amount reaches a specific value, and if the detected operated amount exceeds the specific value, the braking of the rear wheel brake is released to switch the interlocking brake control into the single brake control of only the front wheel brake.

When the detected operated amount exceeds a specific value, interlocking brake control is switched into single brake control of only the front wheel brake, and accordingly, the braking of the rear wheel brake is released on the basis of the running state due to the brake operation, so that it is possible to easily perform control of a vehicular body posture.

According to the present invention, there is provided a front wheel and rear wheel interlocking brake system for a motorcycle in which a front wheel brake and a rear wheel brake, each being hydraulically operated, are provided on a front wheel and a rear wheel, respectively, the brake system includes a front wheel side actuator for applying a hydraulic pressure to the front wheel brake. A rear wheel side actuator is provided for applying a hydraulic pressure to the rear wheel brake. First and second brake operating means are operated by a driver. First and second operated amount detecting means are provided for detecting operated amounts of the first and second brake operating means, respectively. A control means is provided for receiving and calculating each of operated amounts detected by the first and second operated amount detecting means, and outputting drive control signals to the front wheel side actuator and the rear wheel side actuator on the basis of the calculated result. The control means receives running state information other than the operated amounts detected by the first and second operated amount detecting means, and performs brake control in such a manner that single brake control for singly driving either the front wheel brake or the rear wheel brake on the basis of the running state information and interlocking brake control for driving the front and rear wheel brakes in accordance with a specific braking force distribution characteristic are switched from each other on the basis of the running state information.

Since brake control is performed in such a manner that single brake control and interlocking brake control in accordance with a specific braking force distribution characteristic are switched from each other on the basis of the running state information, it is possible to automatically perform brake control on the basis of the running state.

Since the brake system has a simple structure in which the front wheel side actuator for operating the front wheel brake and the rear wheel side actuator for operating the rear wheel brake are driven by the control means, it is possible to easily perform the piping work and maintenance work and to increase the degree of freedom in piping layout.

According to the present invention, the running state information is the vehicular speed. When the vehicular speed exceeds a specific value, single brake control is switched into interlocking brake control, and accordingly, it is possible to realize a smooth and effective brake control on the basis of the vehicular speed.

According to the present invention, there is provided a front wheel and rear wheel interlocking brake system for a motorcycle in which a front wheel brake and a rear wheel brake, each being hydraulically operated, are provided on a front wheel and a rear wheel, respectively. The brake system includes a front wheel side actuator for applying a hydraulic pressure to the front wheel brake. A rear wheel side actuator is provided for applying a hydraulic pressure to the rear wheel brake. First and second brake operating means are operated by a driver. First and second operated amount detecting means are provided for detecting operated amounts of the first and second brake operating means, respectively. A control means is provided for receiving and calculating each of operated amounts detected by the first and second operated amount detecting means, and outputting drive control signals to the front wheel side actuator and the rear wheel side actuator on the basis of the calculated result. The control means receives running state information other than the operated amounts detected by the first and second operated amount detecting means, and changes a distribution characteristic of the braking forces applied to the front wheel brake and the rear wheel brake on the basis of the running state information.

It is possible to perform brake control in accordance with the optimum braking force distribution characteristic by changing the distribution characteristic of braking forces applied to the front wheel brake and rear wheel brake on the basis of the running state of the vehicle.

According to the present invention, the running state is a slip state of the front and rear wheel wheels. Since the ratio in weight applied between the front and rear portions of the vehicle can be judged on the basis of the slip state of the front wheel and rear wheel, it is possible to set the optimum distribution characteristic of the braking forces applied to the front and rear wheel brakes on the basis of the ratio in weight between the front and rear portions of the vehicle and hence to realize a smooth and effective brake control on the basis of the running state.

According to the present invention, there is provided a front wheel and rear wheel interlocking brake system for a motorcycle in which a front wheel brake and a rear wheel brake, each being hydraulically operated, are provided on a front wheel and a rear wheel, respectively. The brake system includes a front wheel side actuator for applying a hydraulic pressure to the front wheel brake. A rear wheel side actuator is provided for applying a hydraulic pressure to the rear wheel brake. A brake operating means is operated by a driver. An operated amount detecting means is provided for detecting an operated amount of the brake operating means. A control means for receiving and calculating an operated amount detected by the operated amount detecting means, and outputting drive control signals to the front wheel side actuator and the rear wheel side actuator on the basis of the calculated result; wherein the control means receives running state information other than the operated amount detected by the operated amount detecting means, and performs brake control in such a manner that single brake control for singly driving either the front wheel brake or the rear wheel brake and interlocking brake control for driving the front and rear wheel brakes in accordance with a specific braking force distribution characteristic are switched from each other on the basis of the running state information.

Only the operation of one brake operating means by the driver allows the control means to perform brake control in such a manner that single brake control and interlocking brake control in accordance with a specific braking force distribution characteristic are switched from each other on the basis of the running state information, and hence to automatically perform brake control of the front and rear wheels on the basis of the running state. Accordingly, since the driver can certainly select the brake operating means to be operated, it is possible to reduce the driver's burden for brake operation.

Since the above brake system has a simple structure, it is possible to easily perform the piping work and maintenance work and to increase the degree of freedom in piping layout.

According to the present invention, there is provided a front wheel and rear wheel interlocking brake system for a motorcycle in which a front wheel brake and a rear wheel brake, each being hydraulically operated, are provided on a front wheel and a rear wheel, respectively. The brake system includes a front wheel side actuator for applying a hydraulic pressure to the front wheel brake. A rear wheel side actuator is provided for applying a hydraulic pressure to the rear wheel brake. A brake operating means is operated by a driver. An operated amount detecting means is provided for detecting an operated amount of the brake operating means. A control means is provided for receiving and calculating an operated amount detected by the operated amount detecting means, and outputting drive control signals to the -front wheel side actuator and the rear wheel side actuator on the basis of the calculated result. The control means receives running state information other than the operated amount detected by the operated amount detecting means, and changes a braking force distribution characteristic of braking forces applied to the front wheel brake and the rear wheel brake on the basis of the running state.

Only the operation of one brake operating means by the driver allows the control means to change a distribution characteristic of braking forces of the front wheel brake and rear wheel brake on the basis of the running state of one vehicle and to perform brake control in accordance with the optimum braking force distribution characteristic.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given wherein below and the accompanying drawings which are given by way of illustration only, and thus are not limitative of the present invention, and wherein.

DETAILED DESCRIPTION OF THE PREFERRED EMBODIMENTS

Hereinafter, embodiments of the present invention will be described with reference to FIGS. 1 to 6.

Figure 1:
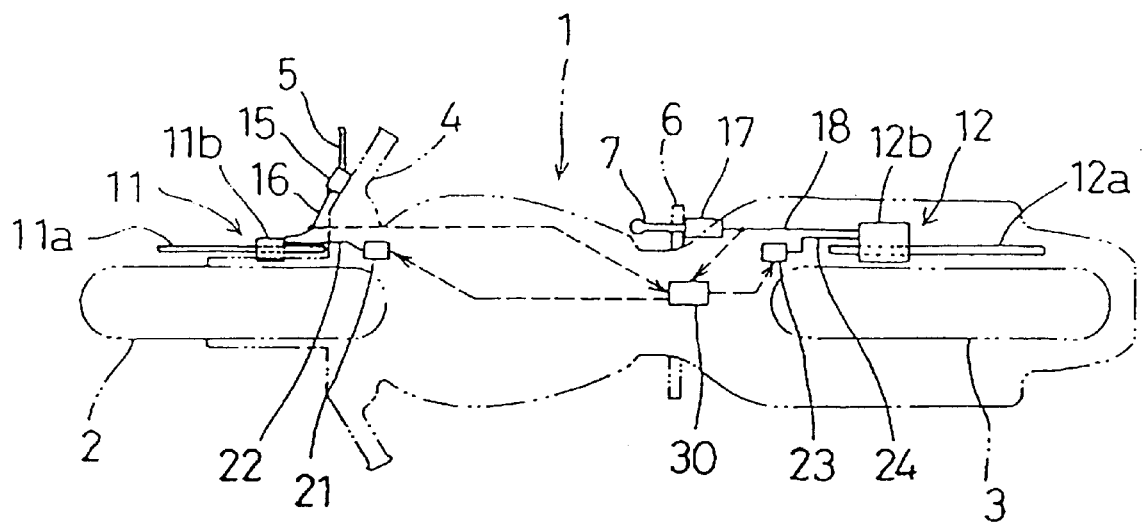
FIG. 1 is a schematic diagram showing a braking line of a motorcycle to which a front wheel and rear wheel interlocking brake system according to one embodiment of the present invention is applied.

FIG. 1 is a schematic diagram showing a braking line of a motorcycle 1 to which a front wheel and rear wheel interlocking brake system 10 according to this embodiment is applied.

A hydraulic front wheel brake 11 is provided on a front wheel 2, and a hydraulic rear wheel brake 12 is provided on a rear wheel 3.

The front wheel brake 11, which is configured as a disk brake, includes a brake disk 11a and a brake caliper 11b, and the rear wheel brake 12, which is also configured as a disk brake, includes a brake disk 12a and a brake caliper 12b.

A brake lever 5 is provided on a right handlebar 4, and a brake pedal 7 is provided near a right step 6.

The brake lever 5 is mounted to a lever master cylinder 15, and the brake pedal 7 is mounted to a pedal master cylinder 17.

Piping of a lever hydraulic line 16 extending from the lever master cylinder 15 is connected to the brake caliper 11b of the front wheel brake 11, and piping of a pedal hydraulic line 18 extending from the pedal master cylinder 17 is connected to the brake caliper 12b of the rear wheel brake 12.

An electronically controlled actuator 21 is disposed near the front wheel brake 11, and is connected to the front wheel brake 11 by means of piping of an electronic control hydraulic line 22.

Similarly, an electronically controlled actuator 23 is disposed near the rear wheel brake 12, and is connected to the rear wheel brake 12 by means of piping of an electronic control hydraulic line 24.

The front and rear electronically controlled actuators 21 and 23 are controlled by an electronic control unit ECU 30, into which detection signals regarding hydraulic pressures of the lever hydraulic line 16 and the pedal hydraulic line 18 are inputted.

Information on the running state of the motorcycle 1, such as a vehicular speed, a wheel speed, a wheel slip state, and inclination of a vehicular body is also inputted into the ECU 30.

Figure 2:
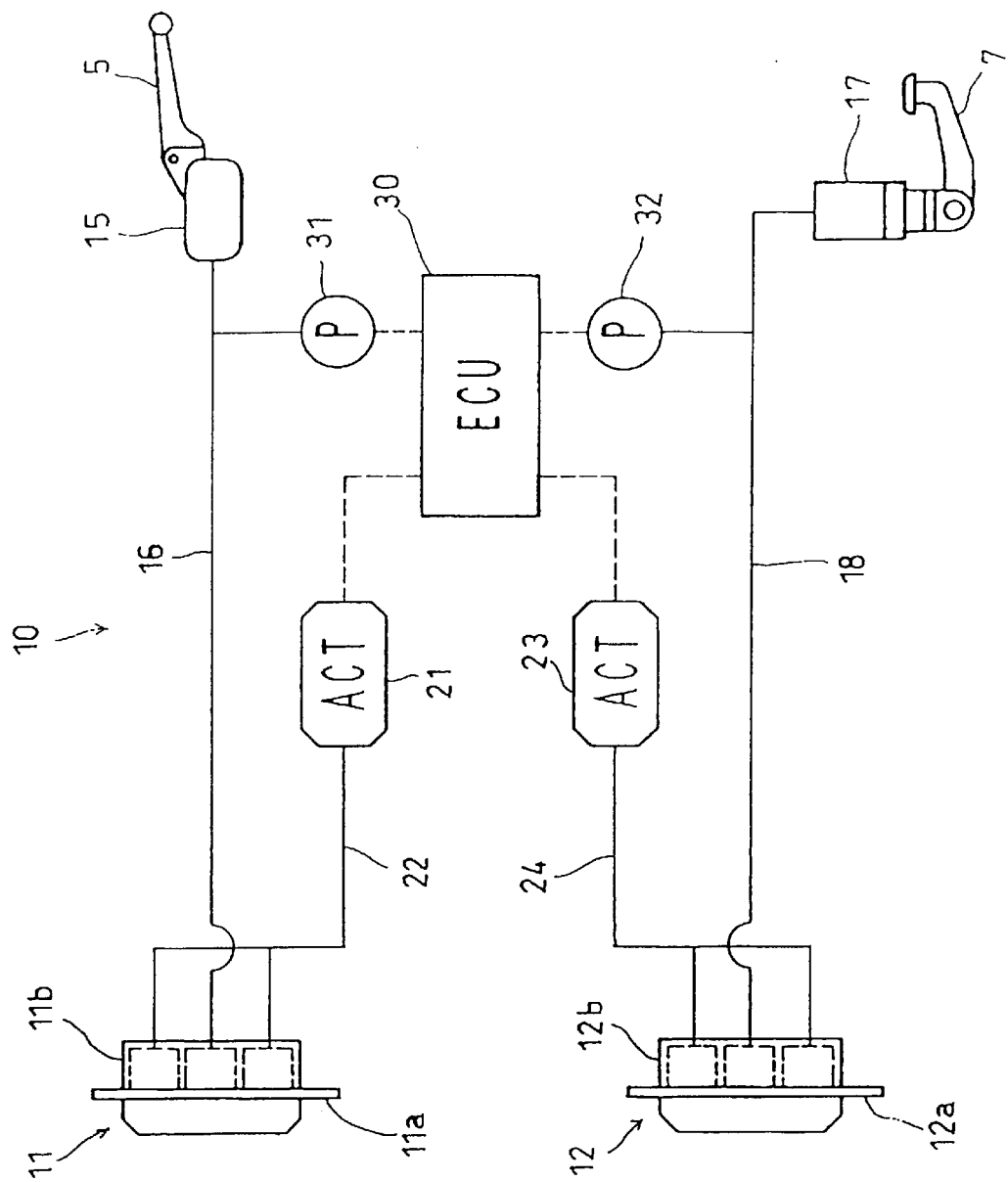
FIG. 2 is a configuration diagram showing the braking line shown in FIG. 1.

The configuration of the above-described braking line is shown in FIG. 2.

A pressure sensor 31 is provided on the lever hydraulic line 16. The pressure sensor 31 is used for detecting an operational pressure generated in the lever master cylinder 15 when the brake lever 5 is operated, and outputting the detection signal to the ECU 30.

Similarly, a pressure sensor 32 is provided on the pedal hydraulic line 18.

The pressure sensor 32 is used for detecting an operational pressure generated in the pedal master cylinder 17 when the brake pedal 7 is operated, and outputting the detection signal to the ECU 30.

The front wheel brake 11 is of a three-port type in which the brake caliper 11b has three pistons, and the lever hydraulic line 16 is connected to one port and the electronically controlled hydraulic line 22 is connected to the other two ports.

Similarly, the rear wheel brake 12 is of a three-port type in which the brake caliper 12b has three pistons, and the pedal hydraulic line 18 is connected to one port and the electronically controlled hydraulic line 24 is connected to the other two ports.

The operation of the brake system of the present invention having the above configuration will be described below.

When an operational pressure detected by the pressure sensor 31 by operation of the brake lever 5 is inputted in the ECU 30, the ECU 30 performs either "single brake control" in which the ECU 30 does not output a signal for driving the rear wheel brake 12 to the electronically controlled actuator 23 or "interlocking brake control" in which the ECU 30 outputs a signal for driving the rear wheel brake 12 to the electronically controlled actuator 23. Similarly, when an operational pressure detected by the pressure sensor 32 by operation of the brake pedal 7 is inputted in the ECU 30, the ECU 30 performs either "single brake control" in which the ECU 30 does not output a signal for driving the front wheel brake 11 to the electronically controlled actuator 21 or "interlocking brake control" in which the ECU 30 outputs a signal for driving the front wheel brake 11 to the electronically controlled actuator 21.

Figure 3:
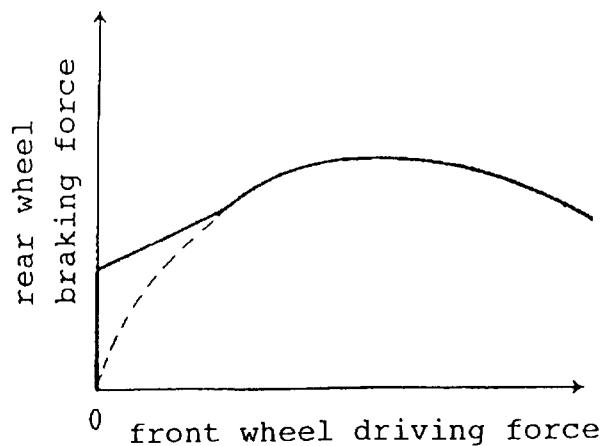
FIG. 3 is a graph showing a distribution characteristic of braking forces applied to front and rear wheel brakes upon single operation of a brake pedal.

The brake control performed by the ECU 30 when only the brake pedal 7 is operated will be described with reference to FIG. 3. FIG. 3 is a graph showing a distribution characteristic of braking forces applied to the front and rear wheel brakes 11 and 12.

In FIG. 3, the abscissa designates the front wheel braking force and the ordinate designates the rear wheel braking force; and a curve shown by a broken line designates an ideal braking force distribution characteristic.

When the brake pedal 7 is operated, a hydraulic pressure is supplied from the pedal master cylinder 17 to the rear wheel brake 12 via the pedal hydraulic line 18, whereby single brake control of the rear wheel is performed. At this time, with an increase in operational force of the brake pedal 7, the hydraulic pressure supplied to the rear wheel brake increases, and thereby the rear wheel braking force also increases.

When the pressure sensor 32 detects that the hydraulic pressure supplied to the rear wheel brake reaches a specific value, the ECU 30 controls the drive of the electronically controlled actuator 21 to supply a hydraulic pressure to the front wheel brake 11 for braking the front wheel 2, thereby changing the single brake control into interlocking brake control.

When the single brake control is changed into the interlocking brake control, the distribution of the braking forces is controlled to be smoothly, readily shifted to the ideal braking force distribution characteristic curve shown by the broken line, and after the distribution of the braking forces is shifted to the ideal braking force distribution characteristic curve, the front wheel and rear wheel interlocking brake control along the ideal braking force distribution characteristic curve is performed.

To be more specific, when the brake pedal 7 is operated, the rear wheel 3 is first braked in accordance with the single brake control, and when the brake pedal 7 is further operated, that is, further depressed and thereby the hydraulic pressure supplied to the rear wheel is increased over the specific value, the single brake control is changed into the interlocking brake control in which the front wheel 2 is braked, whereby the brake control based on the ideal braking force distribution characteristic is performed.

As a result, it is possible to reduce a so-called "nose dive" in which the vehicular body is tilted forwardly upon braking operation.

Figure 4:
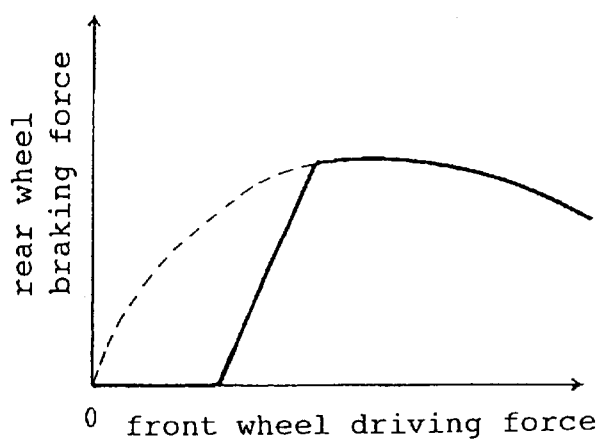
FIG. 4 is a graph showing a distribution characteristic of the braking forces applied to front and rear wheel brakes upon single operation of a brake lever.

When only the brake lever 5 is operated, the brake control shown in FIG. 4 is performed.

To be more specific, when the brake lever 5 is operated, a hydraulic pressure is supplied to the front wheel brake 11 via the lever hydraulic pressure line 16, whereby single brake control of the front wheel is performed. At this time, with an increase in operational force of the brake lever 5, the front wheel braking force increases. When the hydraulic pressure supplied to the front wheel brake reaches a specific value, the electronically controlled actuator 23 is driven to supply a hydraulic pressure to the rear wheel brake 12 for braking the rear wheel 3, thereby changing the single brake control into interlocking brake control.

When the single brake control is changed into the interlocking brake control, the distribution of the braking forces is controlled to be smoothly, readily shifted to the ideal braking force distribution characteristic curve shown by the broken line; and after the distribution of the braking forces is shifted to the ideal braking force distribution characteristic curve, the front wheel and rear wheel interlocking brake control along the ideal braking force distribution characteristic curve is automatically performed.

As described above, when one of the brake lever 5 or the brake pedal 7 is operated, the brake control by the ECU 30 is performed such that the single brake control is switched to the interlocking brake control on the basis of the hydraulic pressure applied to the front brake or rear brake. As a result, the brake control can be automatically performed on the basis of the running state of the motorcycle.

A front wheel and rear wheel interlocking brake system 50 according to another embodiment will be described with reference to FIG. 5.

The front wheel and rear wheel interlocking brake system 50 has a basic configuration substantially the same as that of the above-described front wheel and rear wheel interlocking brake system 10 except that the lever hydraulic pressure line 16 for directly connecting the lever master cylinder 15 to the front wheel brake 11 and the pedal hydraulic pressure line 18 for directly connecting the pedal master cylinder 17 to the rear wheel brake 12 in the above-described front wheel and rear wheel interlocking brake system 10 are omitted in the front wheel and rear wheel interlocking brake system 50.

Figure 5:
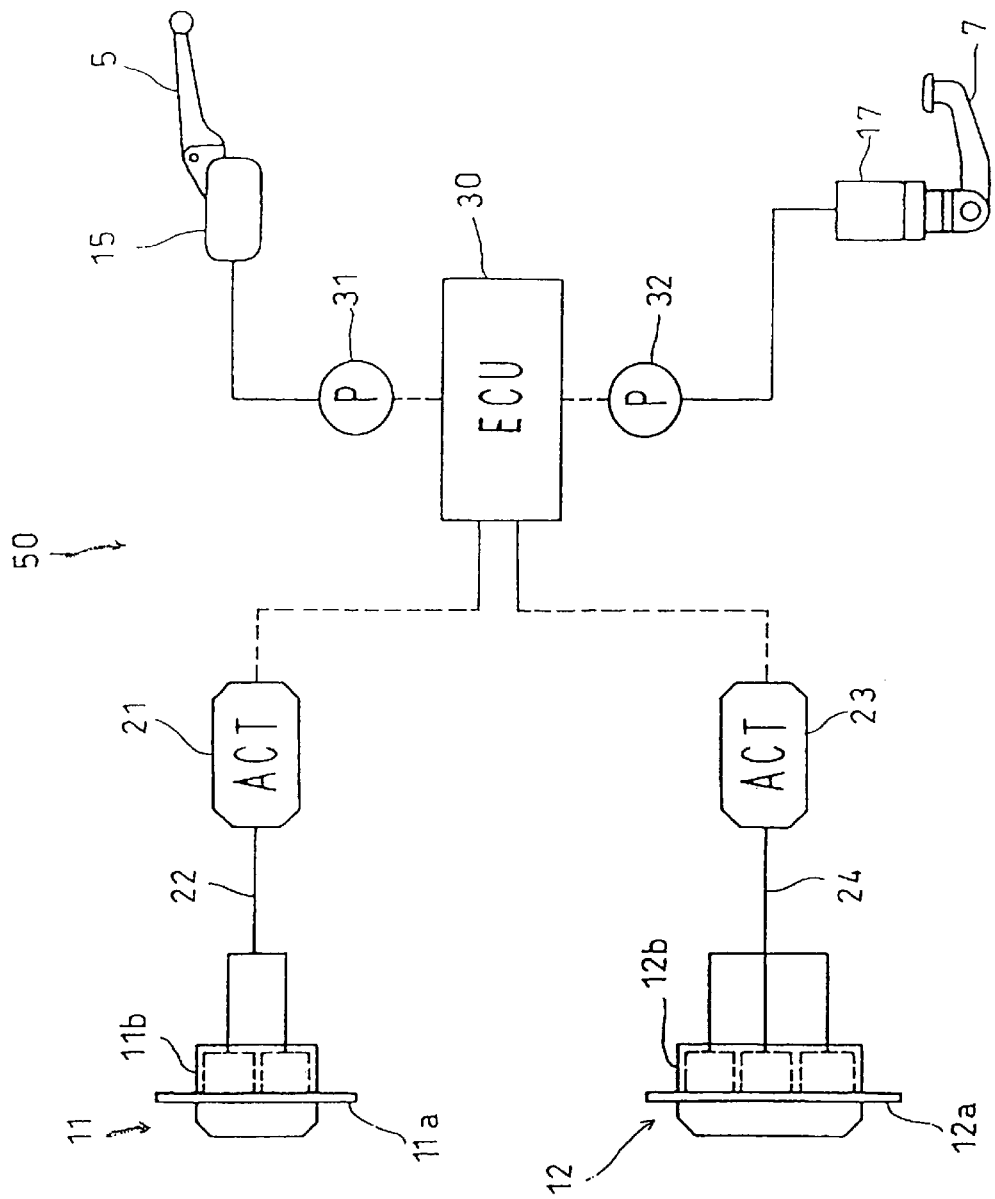
FIG. 5 is a configuration diagram of a braking line of a front wheel and rear wheel interlocking brake system according to another embodiment.

Accordingly, in FIG. 5, parts corresponding to those shown in FIG. 2 are designated by the same reference numerals.

In addition, unlike the configuration of the above-described embodiment, the front wheel brake 11 has a brake caliper 11*b* of a two-port type.

When a brake lever 5 or a brake pedal 7 is operated, an operational hydraulic pressure is generated in a lever master cylinder 15 or a pedal master cylinder 17. Such a hydraulic pressure is detected by a pressure sensor 31 or 32 and a detection signal is inputted in an ECU 30.

The ECU 30 receives not only detection signals regarding operational hydraulic pressures from the pressure sensors 31 and 32 but also information on the running state such as a vehicular speed, a wheel speed, a wheel slip state, and an inclination of a vehicular body; calculates the detection signals and the running state formation; and outputs drive control signals to electronically controlled actuators 21 and 23, thereby controlling the drive of a front wheel brake 11 and a rear wheel brake 12.

As described above, according to the front wheel and rear wheel interlocking brake system 50, the front wheel brake 11 and the rear wheel brake 12 do not directly receive the hydraulic pressures from the master cylinders 15 and 17 but are perfectly electronically controlled by the ECU 30.

Accordingly, the brake control shown in FIGS. 3 and 4 can be performed.

Figure 6:
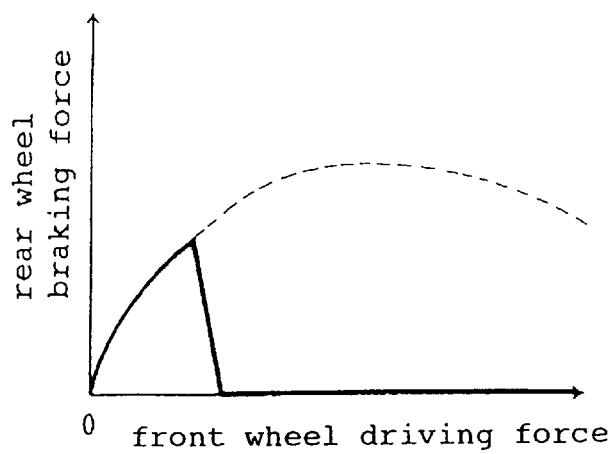
FIG. 6 is a graph showing braking forces applied to front and rear wheel brakes in one example of brake control.

According to the front wheel and rear wheel interlocking brake system 50, the interlocking brake control can be also switched into the single brake control. To be more specific, in the case where the interlocking brake control along an ideal braking force distribution characteristic curve shown in FIG. 6 is performed on the basis of an operational hydraulic pressure, if the operational hydraulic pressure is raised to increase the braking force and thereby the operational hydraulic pressure reaches a specific value, the interlocking brake control can be switched into the single brake control in which only the front wheel 2 is braked only by the front wheel brake 11, by stopping the application of the hydraulic pressure to the rear wheel brake 12 to release the braking of the rear wheel 3.

Such brake control for releasing the braking of the rear wheel 3 allows the posture control of a vehicular body to be easily performed.

Figure 7:
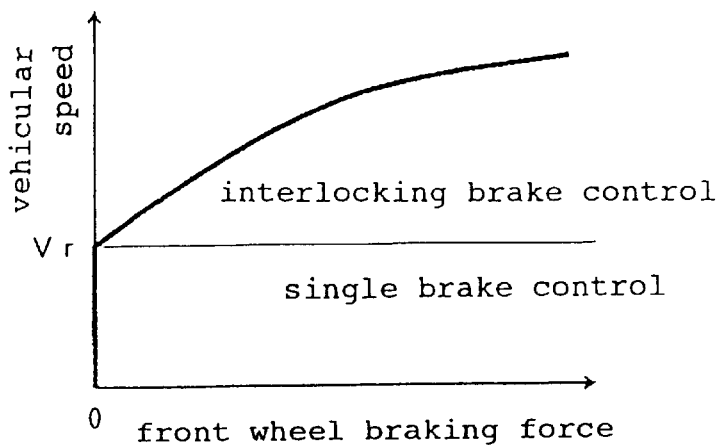
FIG. 7 is a graph showing a relationship between a vehicular speed and a front wheel braking force in one example of the brake control based on a vehicular speed.

According to the front wheel and rear wheel interlocking brake system 50, the brake control can be configured such that either single brake control or interlocking brake control is determined on the basis of a vehicular speed. For example, on the basis of a graph of FIG. 7 showing a relationship between a vehicular speed and a front wheel braking force, single brake control may be selected in the running state of a vehicular speed of Vr or less, and interlocking brake control may be selected in the running state of a vehicular speed of more than Vr.

To be more specific, it is possible to effectively decelerate the vehicular speed by interlocking brake control in a high speed running state, and to improve steerability by single brake control of the rear wheel brake in a low speed running state.

The ratio in weight applied between the front and rear portions of the vehicular body differs depending on the riding condition of the motorcycle, that is, depending on the fact whether only a driver rides on a driver's seat or a passenger also rides on a pillion, and varies depending on the running condition, that is, depending on the fact whether the motorcycle runs along a flat road or a sloping road. In other words, the ideal braking force distribution characteristic in interlocking brake control differs depending on the above riding state and/or running state of the motorcycle.

Since the ratio in weight between the front and rear portions of the vehicular body can be substantially expressed by slip states of the front and rear wheels, it may be considered to calculate the slip states of the front and rear wheels on the basis of the wheel speed and vehicular speed and change the ideal braking force distribution characteristic on the basis of the slip states thus calculated.

Figure 8:
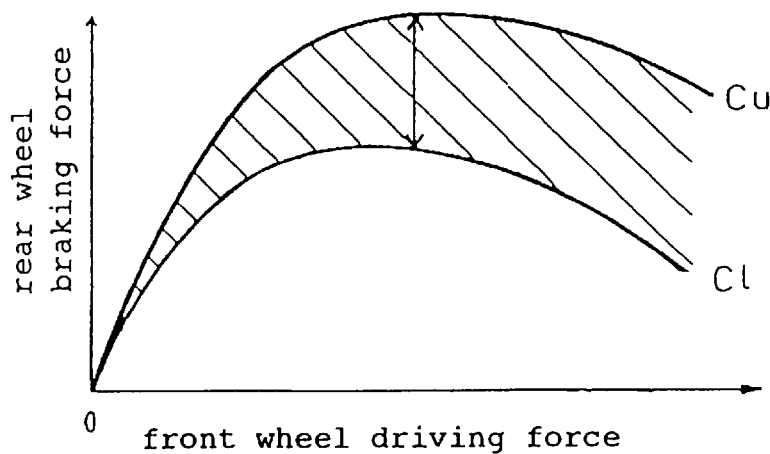
FIG. 8 is a graph showing an ideal braking force distribution characteristic in one example of brake control based on slip states of wheels.

The front wheel and rear wheel interlocking brake system 50 can perform the control for changing the ideal braking force distribution characteristic on the basis of the slip states of the front and rear wheels. To be more specific, as shown in FIG. 8, the brake system 50 can change the ideal braking force distribution characteristic on the basis of the slip states of the front and rear wheels between an upper limit ideal braking force distribution characteristic curve Cu and a lower limit ideal braking force distribution characteristic curve Cl.

The brake control can be further improved to be performed along the optimum braking force distribution characteristic by changing the ideal braking force distribution characteristic in interlocking brake control on the basis of the running state (slip states of the front and rear wheels) as described above.

Each of the brake systems 10 and 50 includes the brake lever 5 and the brake pedal 7 as the brake operating means operated by the driver in the above embodiments; however, it may be considered to provide only one of the above two brake operating means and perform brake control by the one brake operating means.

A front wheel and rear wheel interlocking brake system 60 according to a third embodiment of the present invention in which only a brake lever is used as the brake operating means will be described with reference to FIG. 9.

Figure 9:
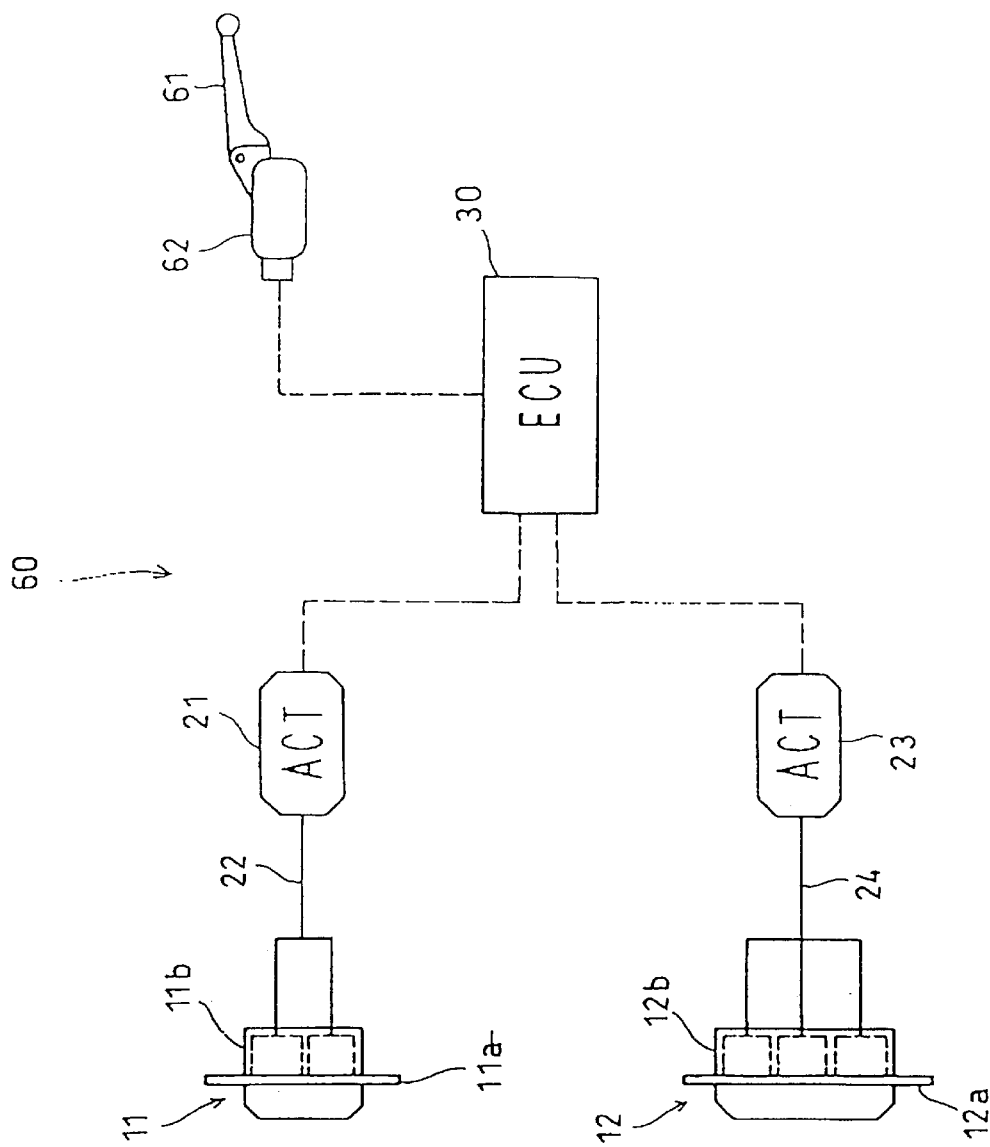
FIG. 9 is a configuration diagram of a braking line of a front wheel and rear wheel interlocking brake system according to a further embodiment.
Figure 10:
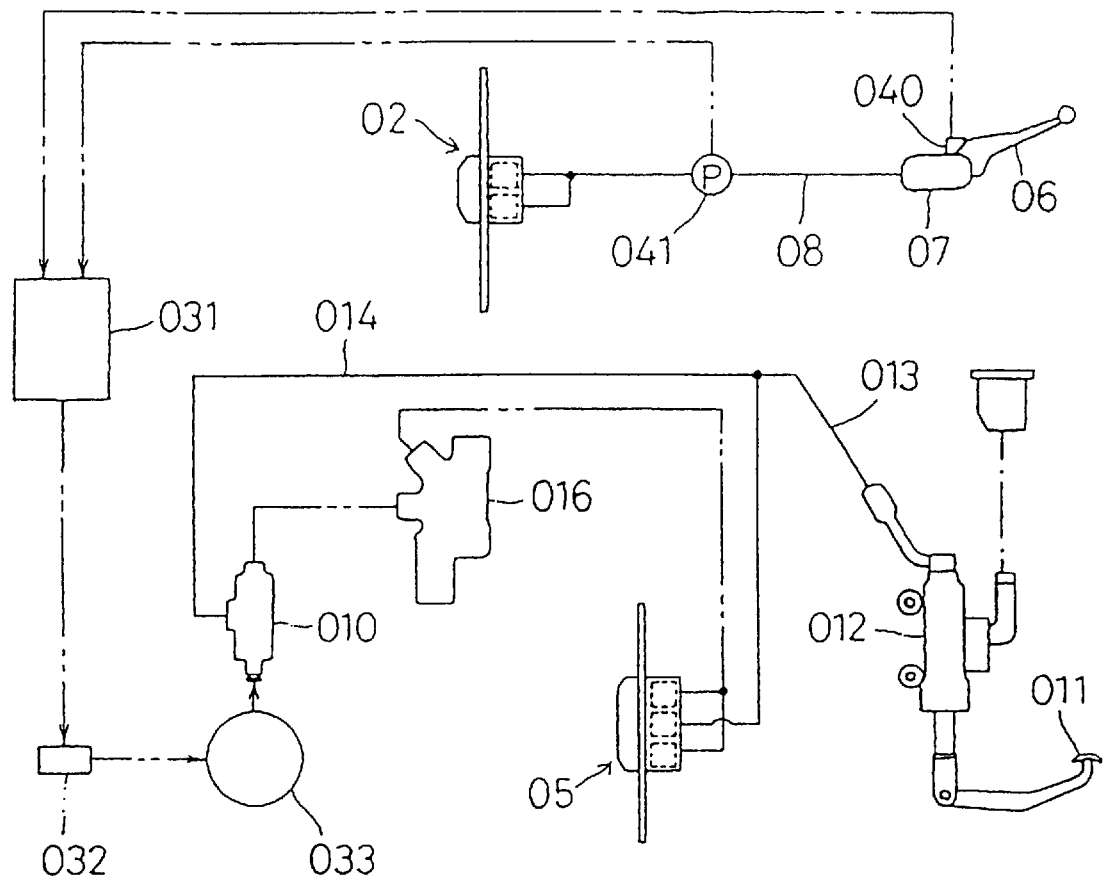
FIG. 10 is a configuration diagram of a braking line of a prior art brake system.

Referring to FIG. 9, the operated amount of a brake lever 61 can be detected by a potentiometer 62, and the operated amount detected by the potentiometer 62 is directly inputted in an ECU 30.

Parts disposed on the downstream side from the ECU 30 are the same as those shown in FIG. 5, and therefore, they are designated by the same reference numerals.

According to the third embodiment, the brake control can be performed such that either braking of the front wheel or braking of the rear wheel is selected on the basis of the running state or either single brake control or interlocking brake control is selected on the basis of the running state, for example, a vehicular speed; or the brake control can be performed such that the ideal braking force distribution characteristic is changed on the basis of the slip states of the front and rear wheels.

Accordingly, it is possible to reduce the driver's work for brake operation.

Since the structure of the brake system 60 is simple, it is possible to easily perform the piping work and maintenance work, and to increase the degree of freedom in piping layout.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A front wheel and rear wheel interlocking brake system for a motorcycle in which a front wheel brake and a rear wheel brake, each being hydraulically operated, are provided on a front wheel and a rear wheel, respectively, said brake system comprising:

a front wheel side actuator for applying a hydraulic pressure to said front wheel brake;

a rear wheel side actuator for applying a hydraulic pressure to said rear wheel brake;

a first and second brake operating means operated by a driver;

an operated amount detecting means for detecting an operated amount of said brake operating means; and a control means for receiving and calculating an operated amount detected by said operated amount detecting means, and outputting drive control signals to said front wheel side actuator and said rear wheel side actuator on the basis of the calculated result, wherein said control means receives running state information other than said operated amount detected by said operated amount detecting means, and performs brake control for single brake control for singly driving either said front wheel brake or said rear, wheel brake and interlocking brake control for driving said front and rear wheel brakes in accordance with a specific braking force distribution characteristic, and causes control to switch between single brake control and interlocking brake control on the basis of said running state information, and wherein said control means also performs brake control in such a manner that when either of said first and second brake operating means is operated, said single brake control is performed until said detected operated amount reaches a specific value, and if said detected operated amount exceeds said specific value, said single brake control is switched into said interlocking brake control.

2. A front wheel and rear wheel interlocking brake system for a motorcycle according to claim 1, wherein:

said brake operating means operated by a driver comprises a brake lever and a brake pedal;

said operated amount detecting means for detecting operated amounts of said brake lever and brake pedal, respectively, comprises a first and second pressure sensor;

said control means receives and calculates each of operated amounts detected by said first and second pressure sensors and outputs drive control signals to said front wheel side actuator and said rear wheel side actuator on the basis of the calculated results; and said control means performs brake control for single brake control for singly driving either said front wheel brake or said rear wheel brake and interlocking brake control for driving said front and rear wheel brakes in accordance with a specific braking force distribution characteristic, and causes control to switch between single brake control and interlocking brake control on the basis of said operated amounts detected by said first and second pressure sensors.

3. The front wheel and rear wheel interlocking brake system for a motorcycle according to claim 2, wherein said control means performs brake control in such a manner that said interlocking brake control is performed until said detected operated amount reaches a specific value, and if said detected operated amount exceeds said specific value, the braking of said rear wheel brake is released to switch said interlocking brake control into said single brake control of only said front wheel brake.

4. A front wheel and rear wheel interlocking brake system for a motorcycle according to claim 1, wherein:

said brake operating means operated by a driver comprises a brake lever and a brake pedal;

said operated amount detecting means for detecting operated amounts of said first and second brake operating means, respectively, comprises two pressure sensors; and said control means receives and calculates each of operated amounts detected by said two pressure sensors, and outputs drive control signals to said front wheel side actuator and said rear wheel side actuator on the basis of the calculated result, wherein said control means receives running state information other than said operated amounts detected by said first and second operated amount detecting means, and performs brake control for single brake control for singly driving either said front wheel brake or said rear wheel brake on the basis of said running state information and interlocking brake control for driving said front and rear wheel brakes in accordance with a specific braking force distribution characteristic and causes control to switch between single brake control and interlocking brake control on the basis of said running state information.

5. The front wheel and rear wheel interlocking brake system for a motorcycle according to claim 4, wherein said running state information is a vehicular speed.

6. A front wheel and rear wheel interlocking brake system for a motorcycle in which a front wheel brake and a rear wheel brake, each being hydraulically operated, are provided on a front wheel and a rear wheel, respectively, said brake system comprising:

a front wheel side actuator for applying a hydraulic pressure to said front wheel brake;

a rear wheel side actuator for applying a hydraulic pressure to said rear wheel brake;

a brake operating means operated by a driver;

an operated amount detecting means for detecting an operated amount of said brake operating means; and a control means for receiving and calculating an operated amount detected by said operated amount detecting means, and outputting drive control signals to said front wheel side actuator and said rear wheel side actuator on the basis of the calculated result, wherein said control means receives running state information other than said operated amount detected by said operated amount detecting means, and changes a braking force distribution characteristic of braking forces applied to said front wheel brake and said rear wheel brake on the basis of said running state, and wherein said control means also performs brake control in such a manner that said interlocking brake control is performed until said detected operated amount reaches a specific value, and if said detected operated amount exceeds said specific value, the braking of said rear wheel brake is released to switch said interlocking brake control into said single brake control of only said front wheel brake.

7. A front wheel and rear wheel interlocking brake system for a motorcycle according to claim 6, wherein:

said brake operating means operated by a driver comprises a brake lever and a brake pedal;

said operated amount-detecting means for detecting operated amounts of said brake lever and brake pedal, respectively, comprises a first and second pressure sensor; and said control means receives and calculates each of operated amounts detected by said first and second pressure sensors and outputs drive control signals to said front wheel side actuator and said rear wheel side actuator on the basis of the calculated result, wherein said control means receives running state information other than said operated amounts detected by said first and second two pressure sensors and changes a distribution characteristic of braking forces applied to said front wheel brake and said rear wheel brake on the basis of said running state information.

8. The front wheel and rear wheel interlocking brake system for a motorcycle according to claim 7, wherein said running state is a slip state of said front and rear wheels.

* * * * *